United States Patent [19]

Penczak

[11] Patent Number: 5,195,288

[45] Date of Patent: Mar. 23, 1993

[54] FLOOR FITTING

[75] Inventor: John Penczak, Washington, W. Va.

[73] Assignee: Butler Manufacturing Company, Parkersburg, W. Va.

[21] Appl. No.: 752,878

[22] Filed: Aug. 30, 1991

[51] Int. Cl.$^5$ ............................................. E04F 17/00
[52] U.S. Cl. .................................... 52/220.1; 174/48
[58] Field of Search ...................... 52/229, 221, 232, 1; 174/48, 49

[56] References Cited

U.S. PATENT DOCUMENTS

| Re. 27,549 | 1/1973 | Flachbarth et al. | 174/49 |
| 4,272,643 | 6/1981 | Carroll et al. | 174/48 |
| 4,289,370 | 9/1981 | Storck | 339/125 |
| 4,323,723 | 4/1982 | Fork et al. | 174/48 |
| 4,336,416 | 6/1982 | Goodsell | 174/48 |
| 4,387,949 | 6/1983 | Haitmanek . | |
| 4,477,694 | 10/1984 | Kohaut | 174/48 |
| 4,496,790 | 1/1985 | Spencer | 174/48 |
| 4,507,900 | 4/1985 | Landis | 52/221 |
| 4,958,047 | 9/1990 | Bartee | 174/48 |
| 4,984,982 | 1/1991 | Brownlie et al. | 174/48 X |

FOREIGN PATENT DOCUMENTS 1284448  8/1972  United Kingdom .................. 174/48

OTHER PUBLICATIONS

"Walkerduct Service Fittings" catalog SF582R.

Primary Examiner—David A. Scherbel
Assistant Examiner—Creighton Smith
Attorney, Agent, or Firm—McAndrews, Held & Malloy, Ltd.

[57] ABSTRACT

This patent discloses a floor fitting for activation of services including electric power and communication services. The floor fitting includes activation sides sized to at least overlie two conventional duplex power receptacles. The floor fitting further provides for routing of service conductors through the fitting to locations above the floor. Additionally, the floor fitting provides for mounting of connectors to the base of the floor fitting and independent of the cover and for accepting decorative cover treatments at ends of the floor fitting adjacent to the activation sides.

15 Claims, 4 Drawing Sheets

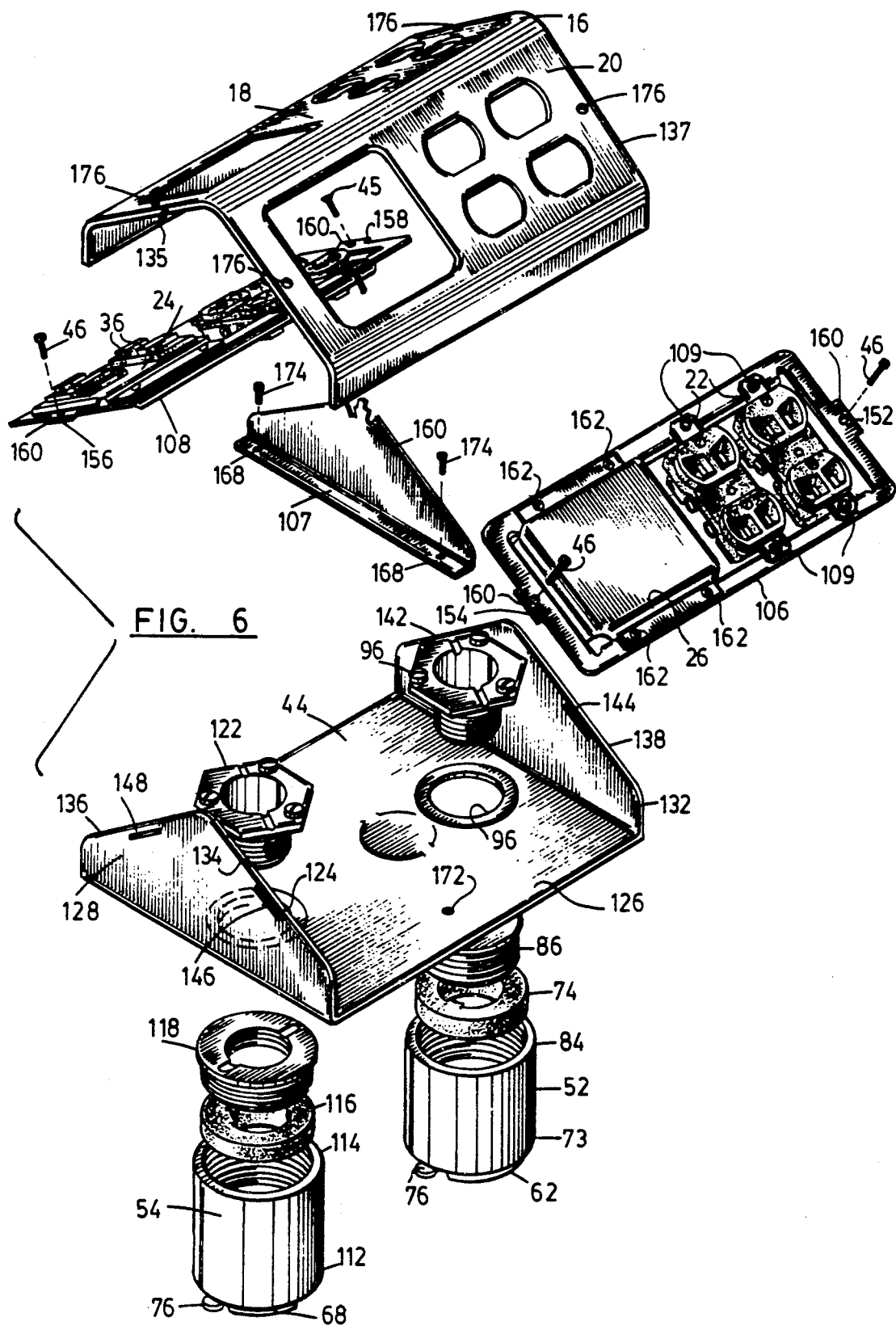

FLOOR FITTING

BACKGROUND OF THE INVENTION

The present invention relates to activation of services from ducts or raceway cast in a concrete floor, and more particularly to a floor fitting that provides activation for different types of services, a larger number of connections to a service than provided by conventional floor fittings, and flexibility of configuration of connections to services.

Modern offices require electric power, communication, and computer data services in various combinations at a large number of locations. An individual workstation may require some or all services and may require several connections to a single service, particularly to electric power. Services are distributed in an office building through ducts in concrete floors. Concrete floors are often constructed having two or more ducts routed closely adjacent to each other to provide multiple services to locations on the floor while maintaining separation of the services. Cellular raceway having three adjacent ducts providing power, communication, and data conductors in individual ducts and individual ducts routed adjacent to each other are widely used to provide separated services. Connection to the services are conventionally provided by floor fittings, preset activations, or both.

Conventional floor fittings are relatively small and provide a limited number of connections to one or two services. Floor fittings are positioned on the surface of a floor and connected to services in ducts through inserts extending through holes in the floor to ducts. Inserts may be installed before the concrete is poured to form the floor, or, after the concrete is poured by boring a hole from the surface of the floor to a duct. Floor fittings may have connectors mounted in a housing on the floor or may provide a path through which conductors may be routed to locations above the floor. Conventional floor fittings are designed to provide activation of one or two services and are sized to occupy a small space on the floor. Two or more floor fittings installed near each other occupy an area similar to that of a preset but do not provide the activation capacity of a preset, either in terms of the number of connectors that may be mounted at the location or the number of conductors that may be routed to locations above the floor, or both.

Conventional preset activations are used with presets overlying two or more ducts. A preset is a void-forming enclosure that is positioned before concrete is poured to form the floor. Preset activations position connectors in the preset, either below the floor surface or flush with the floor surface. The size of the preset limits the number of connectors that can be mounted within the preset and the number of configurations of connectors for different services that may be provided by a preset activation. Preset activations conventionally include activation hardware such as shields and connectors, or channels for routing conductors through the preset for connection above the floor, or both. Providing services through a preset requires that the location be identified and a preset installed before the concrete floor is poured.

Presets and floor fitting inserts installed prior to pouring a concrete floor provide relatively inexpensive access to services after the concrete floor has been poured. A removable mud cap that is generally parallel to the surface of the floor is positioned slightly below the concrete floor surface providing access to the interior of the preset or insert. The concrete above the mud cap may be broken away with hand tools, the mud cap removed. A preset activation may be installed in a preset from above the floor. A floor fitting may be installed from above the floor by attaching a housing to the insert and routing conductors through the insert.

The demand for services in an office frequently exceeds the capacity of installed floor fittings and preset activations. If a preset has been installed at the location where additional service is required, a preset activation may be installed in the preset. If a floor fitting insert has been installed at the required location, a floor fitting may be connected to the insert. If no preset or insert is installed at the required location, one or more floor fittings must be installed by boring holes in the concrete floor for floor fitting inserts. Boring holes in concrete is the most expensive and time consuming of the options for providing additional service.

Aesthetics of service connections are always considered in addition to the functional requirements of providing connection to services. Preset activations and floor fittings are preferably compatible with the floor treatment of the office, whether tile or carpet, or other feature of the office interior. In offices in which both preset activations and floor fittings are installed, consistent aesthetics are desireable.

Accordingly, a need exists for activation of services from multiple conductor-carrying channels that provides greater activation capacity than conventional presets or floor fittings. In addition, a need exists for a floor fitting that provides flexibility for configuration of various types of connectors for services. Further, a need exists for a floor fitting that ca be activated from a preset or through floor fitting inserts and provide consistent appearance from either type of activation.

SUMMARY OF THE INVENTION

This invention provides an improved floor fitting that can be activated from presets or floor fitting inserts and that overcomes the above described disadvantages arising from use of conventional floor fittings or preset activations. The improved floor fitting of the present invention is constructed to be activated through at least one activation hole formed from the surface of a concrete floor to a service duct in the floor. The floor fitting of the present invention provides a cover having two activation sides, each sized to overlie at least two conventional duplex power receptacles, and provides passages for routing conductors through the fitting to locations above the floor.

More particularly, the floor fitting of the present invention includes a housing having a base that overlies one or more activation holes formed in the floor and has activation openings positioned to be aligned with the holes in the floor, and a cover overlying the base and defining a housing interior sized to enclose connectors. The present invention further provides a means for mounting connectors within the housing and a cover that includes openings providing access to connectors mounted within the housing. In addition, the present invention includes a cover having openings sized to overlie faceplates having a predetermined dimension. The present invention also provides faceplates having the predetermined outer dimensions and openings formed to accept different connectors or openings through which conductors may be routed to locations above the floor. Consequently, this invention provides a larger number of connectors than conventional floor fittings o preset activations. Further, the present invention provides a cove with openings for faceplates for connectors allowing connectors to be changed by providing a faceplate.

Accordingly, it is an object of the present invention to provide an improved floor fitting that provides activation of one or more services, each carried by conductors within separated conductor-carrying ducts in a concrete floor.

Another object of the present invention is to provide a floor fitting for activation of one or more services that provides a larger number of connectors for each service than are provided by conventional floor fittings or preset activations.

Yet another object of the present invention is to provide a floor fitting for activation of more than one service that provides for both mounting connectors within the floor fitting and routing of the conductors through the floor fitting for each service.

A further object of the present invention is t provide a floor fitting for activation of more than one service that maintains separation of the services within the fitting.

It is yet a further object of the present invention to provide a floor fitting for activation of one or more services in which connectors, connector mounting faceplates, and blank faceplates are mounted to the floor fitting independent of the cover and the cover may be secured to the floor fitting after connection of the connectors to conductors and mounting of the connectors within the floor fitting.

Another object of the present invention is to provide a floor fitting that is mounted to a preset, provides activation of electric power and at least one other service, and maintains separation of electric power from the other services.

Yet another object of the present invention is to provide a floor fitting having activation sides that are sized to overlie at least two duplex poser connectors.

These and other objects and advantages of the present invention, as well as details of the preferred embodiment thereof, will be more fully understood from the following description and the drawings.

BRIEF DESCRIPTION OF THE DRAWINGS

FIG. 6 is a perspective exploded view of the floor fitting according to the present invention shown in FIG. 1.

In the following detailed description, spatially orienting terms are used such as "left," "right," "upward," "downward," and the like. It is to be understood that these terms are used for convenience of description of the preferred embodiments by reference to the drawings; unless so specified, these terms do not necessarily describe the absolute location in space, such as left, right, upward, downward, etc., that any part must assume.

DESCRIPTION OF THE PREFERRED EMBODIMENT

Figure 1:
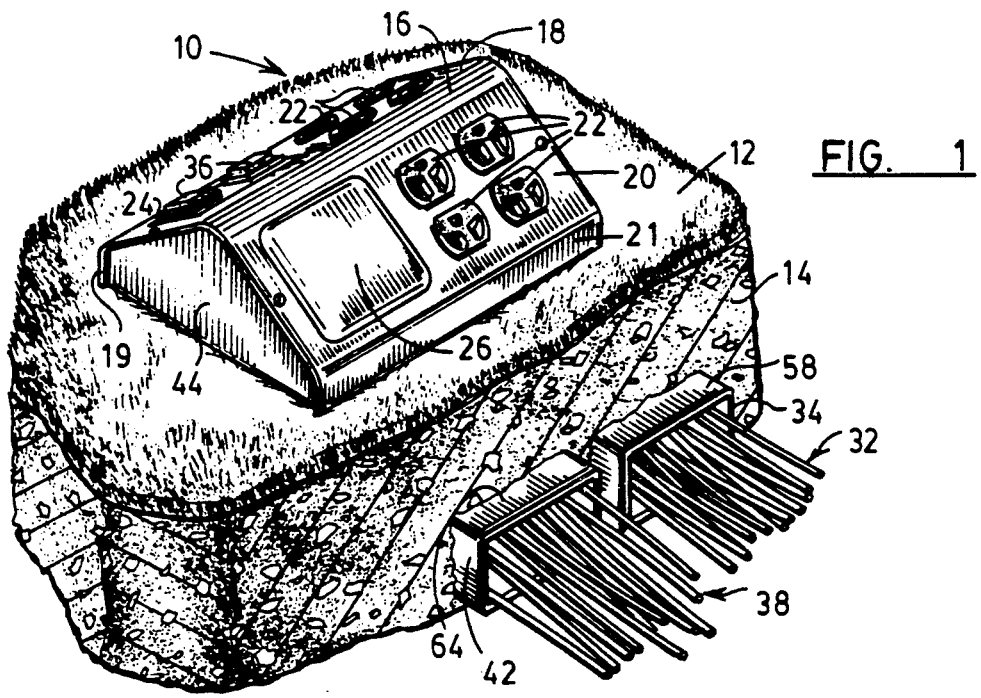
FIG. 1 is a perspective view of a floor fitting according to the present invention overlying a cut-away section of a concrete floor and conductor carrying ducts from which the floor fitting is activated.

FIG. 1 shows a floor fitting 10 according to the present invention mounted on floor surface 12 of concrete floor 14. A conventional floor covering, such as tile or carpet as shown in FIG. 1, may overlie the surface 12 on which a floor fitting 10 is mounted. The floor covering may be affixed to a base 44 of floor fitting 10 overlying end walls of base 44 as shown by FIG. 1.

The floor fitting 10 shown in FIG. 1 provides activation of two services, telephone and electric power. A cover 16 overlies the base 44 defining an interior of floor fitting 10. Conventional duplex power connectors 22, connector mounting faceplate 24 and blank faceplate 26 are mounted in floor fitting 10 and are positioned in openings in first and second activation sides 18 and 20 of the cover 16. Faceplates 24 and 26 have identical outside dimensions and may be positioned in either opening of cover 16 sized to accept a faceplate. Duplex power connectors 22 are activated by connection to power conductors 32 from a power duct 34 in the floor 14 and telephone connectors 36 are activated by connection to telephone conductors 38 from a telephone duct 42 in the floor 14.

Figure 2:
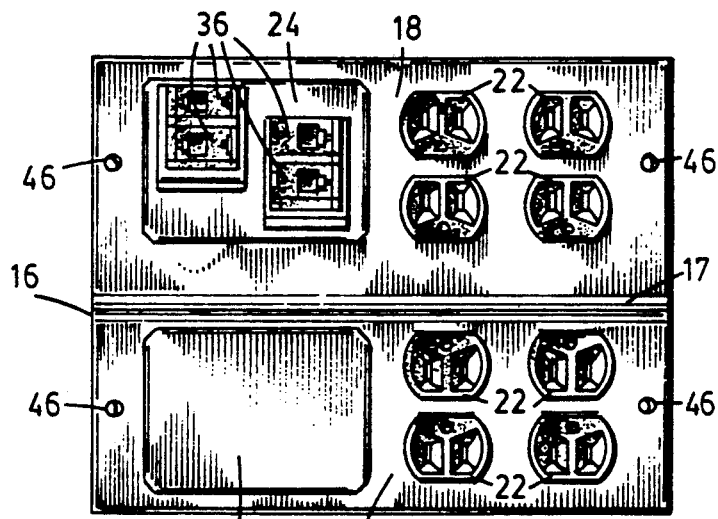
FIG. 2 is a top view of the floor fitting according to the present invention shown in FIG. 1 that provides conventional electric power and telephone connectors.

As shown by FIG. 2, activation sides 18 and 20 are planar and symmetrically extend away from a peak 17 of the cover 16 and toward the floor surface 12. The peak 17 is the highest extent of the floor fitting 10 above the floor surface 12 and extends, in a lengthwise direction of the floor fitting 10, to overlie the power duct 34 and the telephone duct 42. Activation sides 18 and 20 extend down to a location above the floor surface 12, and skirts 19 and 21 extend to the floor surface 12 from activation sides 18 and 20, respectively. The cover 16 is secured to the base 44 by cover screws 46 extending through two locations in activation sides, 18 and 20, approximately midway between the peak 17 and skirts 19 and 21, respectively, near each end of the activation sides.

Figure 3:
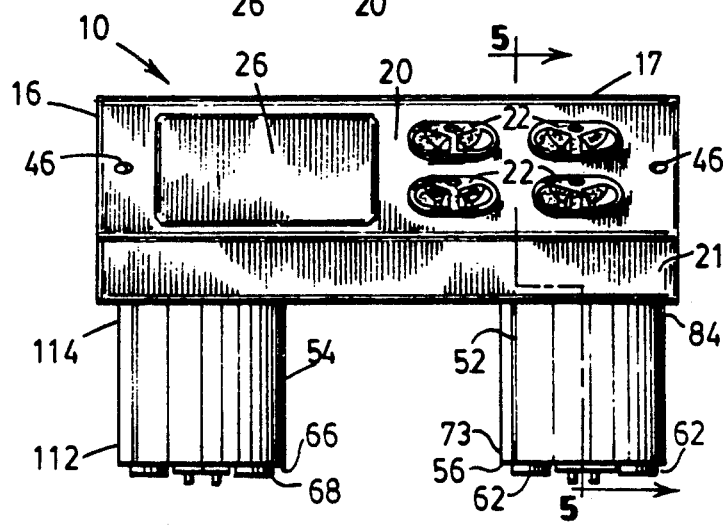
FIG. 3 is a side view of the floor fitting according to the present invention shown in FIG. 1.

FIG. 3 shows a side view of the floor fitting 10 including power insert 52 and telephone insert 54. The power insert 52 extends from a duct end 73 to a base end 84 that is secured to the base 44. The telephone insert 54 extends from a duct end 112 to a base end 114 that is secured to the base 44. As presently preferred, inserts 52 and 54 are conventional floor fitting inserts and are made of an electrically conducting material. Also, base 44 is preferred to be steel and is also electrically conducting.

The base 44 is positioned on the floor surface 12, as shown by FIG. 1, with the power insert 52 and the telephone insert 54 in separate activation holes (not shown) in the floor 14. These two holes extend, respectively, from an opening in the floor surface 12 to the power duct 34 and from an opening in the floor surface 12 to the telephone duct 42. The activation holes in the concrete floor 14 may be made by boring, in a conventional manner, through the concrete floor 14 from the floor surface 12 to upper wall 58 of the power duct 34 and from the floor surface 12 to upper wall 64 of the telephone duct 42 after the concrete floor 14 has set.

After the activation holes have been made in the concrete floor 14 so as to provide access to upper walls 58 and 64 from above the floor surface 12, holes (not shown) of smaller dimension than the adjacent activation holes are cut through upper walls 58 and 64. The holes in upper walls 58 and 64 may be cut from above the floor surface 12 using a conventional hole saw inserted through the activation holes.

Alternatively, holes may be cut in upper walls 58 and 64 before the concrete floor 14 is poured. Inserts 52 and 54 may be secured to walls 58 and 64, as described below, and a mud cap placed overlying the base ends 84 and 114 of inserts 52 and 54. The concrete floor may be poured enclosing inserts 52 and 54. After the floor has set, the layer of concrete overlying the mud caps may be broken away and the mud caps removed providing access to the inserts 52 and 54.

The power insert 52 has a larger cross section than the hole cut in the upper wall 58 and includes an end seating surface 56 at the outer edge of the end surface at the duct end 73. Positioning flanges 62 have a smaller cross section than the hole cut in the upper wall 58, extend from the seating surface 56 away from power insert 52. Similarly, the telephone insert 54 has a larger cross section than the hole cut in the upper wall 64 and includes an end seating surface 66 at the outer edge of the end surface at the duct end 112. Positioning flanges 66 extend from the seating surface 66 away from the telephone insert 54 and have a smaller outer cross section than the hole cut in the upper wall 64. The power insert 52 is sized extend from the base 44 overlying the floor surface 12 through the activation hole in the floor 14 to position the seating surface 56 against the upper wall 58 with positioning flanges 62 in the hole in the upper wall 58. Similarly, the telephone insert 54 is sized to extend from the base 44 to position the seating surface 66 against the upper wall 64 with positioning flanges 68 in the hole in the upper wall 64. Positioning flanges 62 and 68 thereby align inserts 52 ad 54, with the holes in upper walls 58 and 64, respectively, for attachment as described below.

Figure 4:
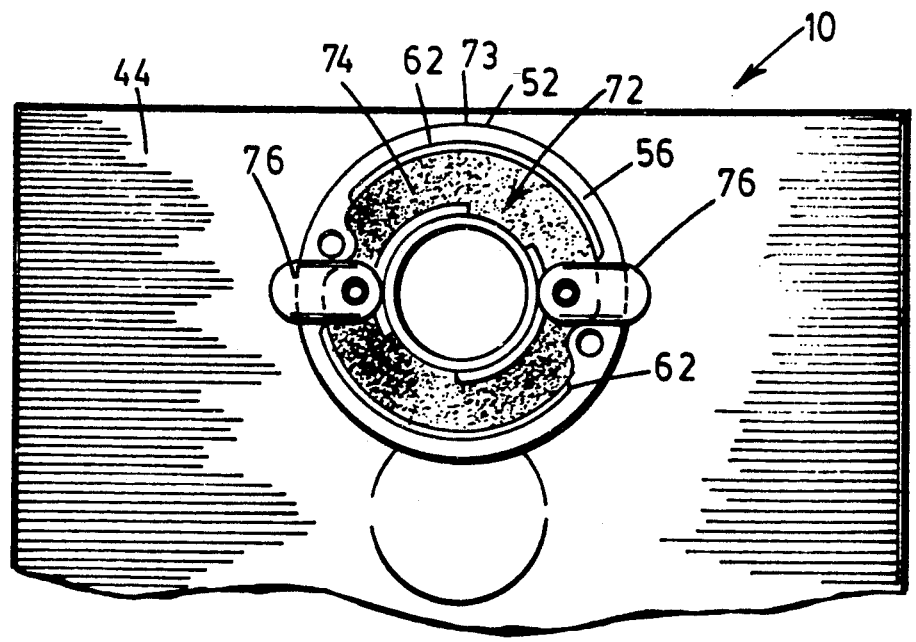
FIG. 4 is a bottom view of a floor fitting insert and adjacent section of the base of the floor fitting according to the present invention shown in FIG. 1.

FIG. 4 is a partial bottom view of the floor fitting 10 including the power insert 52. The power insert 52 is tubular and has a round cross section. Opposed arcuate positioning flanges 62 extend from the duct end 73 and are of smaller outer diameter than and concentric with the outer diameter of the power insert 52. The power insert 52 defines a conductor passage 72 extending through the power insert 52 from the duct end 73 to the base end 84. FIG. 4 also shows two mounting tabs 76 extending outwardly from within the conductor passage 72, overlying the seating surface 56, and extending beyond the outer diameter of the power insert 52. As shown by FIG. 4, an annular intumescent wafer 74 having an opening through its center is positioned within the conductor passage 72.

Figure 5:
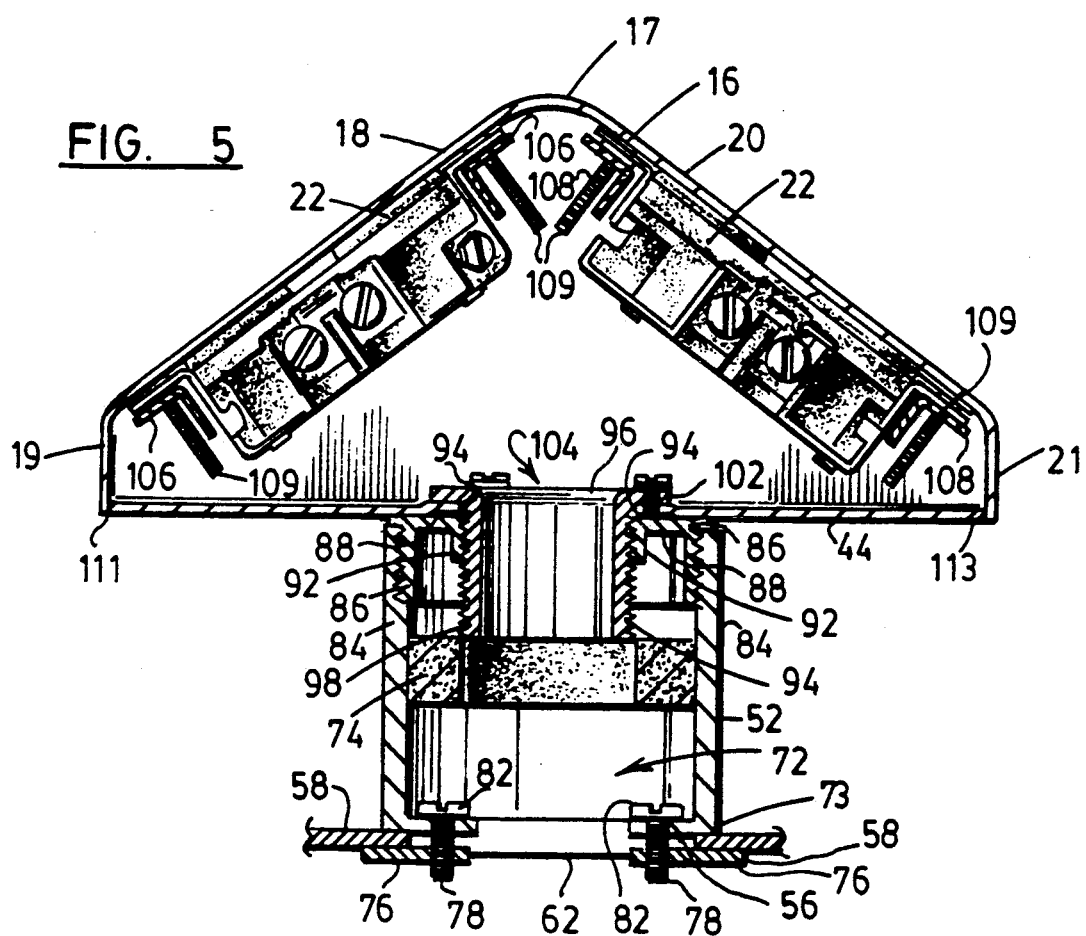
FIG. 5 is a view of the section of the floor fitting according to the present invention that is labeled 5—5 in FIG. 3 and a cutaway section of a duct to which it is attached.

FIG. 5 shows section 5—5 of FIG. 3 through the floor fitting 10 and a cut away section of the upper wall 58 of the power duct 34. As shown in FIG. 5, a positioning flange 62 extends through the hole in the upper wall 58 and the seating surface 56 is positioned against an outer surface of the upper wall 58. Two opposed mounting flanges 82 extend into conductor passage 72 from the power insert 52. A mounting screw 78 is positioned in a hole in each mounting flange 82 so that a head of the screw 78 abuts mounting flange 82 and a threaded section extends into the power duct 34. The threaded section of each mounting screw 78 that extends int the power duct 34 engages a threaded hole in a mounting tab 76. Each mounting tab 76 extends outwardly from a mounting screw 78 within the power duct 34 to overlie the upper wall 58 adjacent to the hole in the upper wall 58. The head of each mounting screw 78 may be rotated by a tool inserted through the power insert 52 to draw the mounting tab 76 toward the power insert 52 and against the upper wall 58, thereby securing upper wall 58 between the seating surface 56 and the mounting tab 76 and securing the power insert 52 to the upper wall 58.

As best shown by FIG. 5, the power insert 52 is attached to the base 44 at the base end 84. Outer insert mounting sleeve 86 has a threaded outer diameter, a flat annular mounting flange 88, and an internally threaded inner opening 92. The annular mounting flange 88 is at an end of the outer insert mounting sleeve 86. The outer insert mounting sleeve 86 engages the internally threaded inner diameter of the base end 84 and positions the annular mounting flange 88 adjacent to the base end 84. The base 44 has an activation opening 94 that is slightly larger than and is aligned with the threaded inner opening 92. Inner mounting sleeve 96 has an externally threaded section 98 that is sized to engage the internally threaded inner opening 92 and a hexagonal head 102. The threaded section 98 of the inner mounting sleeve 96 extends through the activation opening 94 and engages the internally threaded inner opening 92 positioning the hexagonal head 102 abutting the base 44 adjacent to activation opening 94. The inner insert mounting sleeve 96 cooperates with outer insert mounting sleeve 86 to capture the base 44 between the hexagonal head 102 and the outer insert mounting flange 88 attaching the power insert 52 to the base 44. The inner mounting sleeve 96 has a conductor passage 104 communicating with conductor passage 72 and opening through the hexagonal head 102. The intumescent wafer 74 is positioned in and conforms to the inner surface of the power insert 52. The opening of intumescent wafer 74 forms a section of the conductor passage 72.

As shown by FIG. 5, the cover 16 overlies the base 44 forming an interior region of the floor fitting 10. The base 44 extends outwardly from activation opening 94 an equal distance in opposite directions to side edges 111 and 113 of the base 44. The distance between side edges 111 and 113 defines a width of the floor fitting 10. Skirts 19 and 21 are adjacent to side edges 111 and 113, respectively, and extend upwardly away from the floor surface 12 equal distances from the base 44 to activation sides 18 and 20, respectively. Activation sides 18 and 20 extend symmetrically upward and inward toward each other to meet at the peak 17 above the power insert 52.

Mounting frames 106 and 108 are positioned within the interior of the floor fitting 10 adjacent to activation sides 18 and 20 respectively. Duplex power connectors 22 are fastened to mounting frames 106 and 108 by mounting screws 109 and are positioned adjacent to activation sides 18 and 20 by mounting frames 106 and 108, respectively. The duplex power connectors 22 are activated by power conductors (not shown) that are routed into the interior of the floor fitting 10 from the power duct 34 through the conductor passage 72 of the power insert 52 nd the conductor passage 104 of the inner mounting sleeve 96. As presently preferred, the mounting frames 106 and 108 are fabricated from steel and are electrically conducting.

FIG. 6 shows an exploded view of the floor fitting 10 shown in FIG. 1. The telephone insert 54 may be sized differently from the power insert 52, but is otherwise constructed similar to the power insert 52. The telephone insert 54 has a duct end 112 and a threaded base end 114. Intumescent wafer 116 is constructed similarly to intumescent wafer 74 and is sized to be positioned in the telephone insert 54 as intumescent wafer 74 is positioned in the power insert 52. Outer insert mounting sleeve 118 is constructed similarly to outer insert mounting sleeve 86 and engages base end 114 as outer insert mounting sleeve 86 engages base end 84. Inner mounting sleeve 122 is constructed similarly to inner, insert mounting sleeve 96 and is sized to extend through an activation opening 124 in the base 44 and engage outer insert mounting sleeve 118 as inner insert mounting sleeve 96 extends through activation opening 94 and engages outer insert mounting sleeve 86. Mounting flange 68 positions the telephone insert 54 within a hole in the upper wall 64 as mounting flange 62 positions the power insert 52 in the upper wall 58. Mounting tabs 76 (one shown) ar mounted to the telephone insert 54 and engage the telephone duct 42 as mounting tabs 76 are mounted to the power insert 52 and engage the power duct 34.

As shown by FIG. 6, activation openings 94 and 124 in the base 44 are separated in the lengthwise direction of the floor fitting 10. The base 44 has end walls 128 and 132 extending upwardly at ends of the floor fitting 10. The end walls 128 and 132 are constructed to conform to the underside of the cover 16. The boundary of end wall 132 adjacent to the cover 16 includes end wall upper edges 138 and 142. The end wall upper edge 138 conforms to the underside of cover 16 adjacent to activation side 20 and the end wall upper edge 142 conforms to the underside of cover 16 adjacent to activation side 18. The end wall 128 includes end wall upper edges 136 and 134. End wall upper edge 136 conforms to the underside of cover 16 adjacent to activation side 18 and the end wall upper edge 134 conforms to the underside of cover 16 adjacent to activation side 20. Opposed mounting frame slots 144 and 146 are formed in end walls 132 and 128 respectively, closely adjacent to end wall upper edges 138 and 134 at locations approximately midway along the length of those edges. Similarly, mounting frame slot 148 is formed in end wall 128 closely adjacent to end wall upper edge 136 approximately midway along its length and a mounting frame slot (not shown) is formed in the end wall 132 closely adjacent to end wall upper edge 142 approximately midway along its length. The mounting frame slots 144 and 146 engage mounting frame tabs 152 and 154 of mounting frame 106 positioning the mounting frame 106 within the interior of fitting 10 generally parallel to and closely spaced from activation side 20, as best shown by FIG. 5. Similarly, mounting frame tab 156 engages mounting frame slot 148 and mounting frame tab 158 engages the mounting frame slot closely adjacent to end wall upper edge 142 to position mounting frame 106 adjacent to activation side 18. Cover holes 160 are formed in mounting tabs 152, 154, 156, and 160 and are sized to engage a threaded section of cover screws 46.

Cover screw 46 engaging cover holes 160 to draw mounting tabs 152, 154, 156, and 158 and cover 16 against side walls 128 and 132. By positioning holes 176 and 160 near side Walls 128 and 132, screws 46 may be tightened to secure mounting frames 106 and 108 and cover 16 to side walls 128 and 132 without unacceptably deforming either. Further, when mounting frames 106 and 108, base 44, and screws 46 are made of a conductive material, electrical continuity is assured after screws 46 are tightened. Cover 16 may be electrically conducting and would also be electrically continuous with base 44 and frames 106 and 108 after screws 46 are tightened.

Base 44 is sized to position sidewalls 128 and 132 inwardly from end edges 135 and 137 respectively to be adjacent to the underside of cover 16. A floor or trim treatment may be affixed to sidewalls 128 and 132 in a conventional manner to be adjacent to end edges 135 and 137 of cover 16.

As shown by FIG. 6, connectors and faceplates may be mounted to a mounting frame, 106 or 108, independent of the cover 16. In particular, duplex power connectors 22 and the blank faceplate 26 are mounted to mounting frame 106. Duplex power connectors 22 are secured to mounting frame 106 by mounting screws 109 and the blank faceplate 26 is attached to mounting frame 106 by mounting screws 162. Connector mounting faceplate 24 is mounted to mounting frame 108.

Partition 166 separates the interior of the floor fitting 10 into a power section adjacent to the power insert 52 and a telephone section adjacent to the telephone insert 54. Duplex power connectors 22 are positioned within the power region and telephone connectors 36 are positioned within the telephone region. The partition 166 is constructed to extend upwardly from the base 44 to mounting frames 106 and 108 and the cover 16. The partition 166 includes a mounting flange 167 which overlies a section of the base 44 and has mounting holes 168. The base 44 has mounting holes 172 (one not shown) aligned with mounting holes 168. Mounting screws 174 extend through mounting holes 168 and engage mounting holes 172 securing the partition 166 to the base 44. It is preferred that the partition 166 be made from a electrically conducting material to function as a shield between activation regions.

The floor fitting 10 is typically installed by forming activation holes in the floor 14 and holes in upper walls 58 and 64 as previously described. Inserts 52 and 54, are secured to ducts 34 and 42 as described above, and conductors 32 and 38 are routed through inserts 52 and 54 respectively. Intumescent wafers 74 and 116 are positioned within inserts 52 and 54, respectively, surrounding the conductors. Outer insert mounting sleeves 86 and 118 are threaded into inserts 52 and 54, respectively. The base 44 is positioned on the floor surface 12 with activation openings 94 and 124 aligned with threaded inner openings in outer insert mounting sleeves 86 and 118, respectively. Conductors are routed through conductor passages of inner insert mounting sleeves 96 and 122. The inner insert mounting sleeves 96 and 122 are threaded into outer insert mounting sleeves 86 and 118, respectively, securing the base 44 to inserts 52 and 54.

Conductors 32 and 38 are connected to connectors 22 and 36, respectively, and the connectors 22 and 36, blank faceplate 26 and connector mounting faceplate 24 are mounted to mounting frames 106 and 108. The mounting frames 106 and 108 are then mounted to the base 44 by deflecting the end walls 128 and 132 outwardly allowing mounting tabs 152, 154, 156 and 158 to be positioned within the mounting slots in end walls 128 and 132 as described above. The cover 16 has openings formed to overlie connectors 22 and 36, mounting faceplate 24, and blank faceplate 26 mounted to mounting frames 106 and 108. The cover 16 is then positioned overlying the base 44, and is secured to the base 44 by cover mounting screws 46 extending through the cover holes 176 and engaging cover mounting holes 160 in mounting frames 106 and 108.

Conductors may be routed through the floor fitting 10 by providing on a faceplate, similar to blank faceplate 26, with a conventional grommeted opening. Further, a faceplate, similar to blank faceplate 26 having an opening sized to accept a conventional conduit connection may be provided to route power connectors through the power section of the floor fitting 10. A similar opening may be provided in end wall 128 or 132 providing a path through which conductors may be routed through floor fitting 10 to locations above the floor.

The cover 16 may be used with connectors other than those shown by replacing blank faceplate 26 or connector mounting plate 24 with faceplates of identical outside dimensions and openings formed to accept different types or numbers of connectors than shown. In this way, the cover 16 can be used for a large number of connector configurations. The cover need not be changed if connector requirements change after installation of floor fitting 10 and the number of covers that must be manufactured to provide a wide range of connector configurations is decreased compared to a fitting in which an entire connector surface must be replaced to change connector configurations. It will be understood that a floor fitting according to the present invention may be constructed as described above have a smaller length. The telephone section may be smaller in the lengthwise direction and smaller openings in cover 16 than shown above provided to accept smaller faceplates. Further a fitting according to the present invention may be provided that is activated through on floor fitting insert may be constructed as described above to have a single section without a partition.

Figure 7:
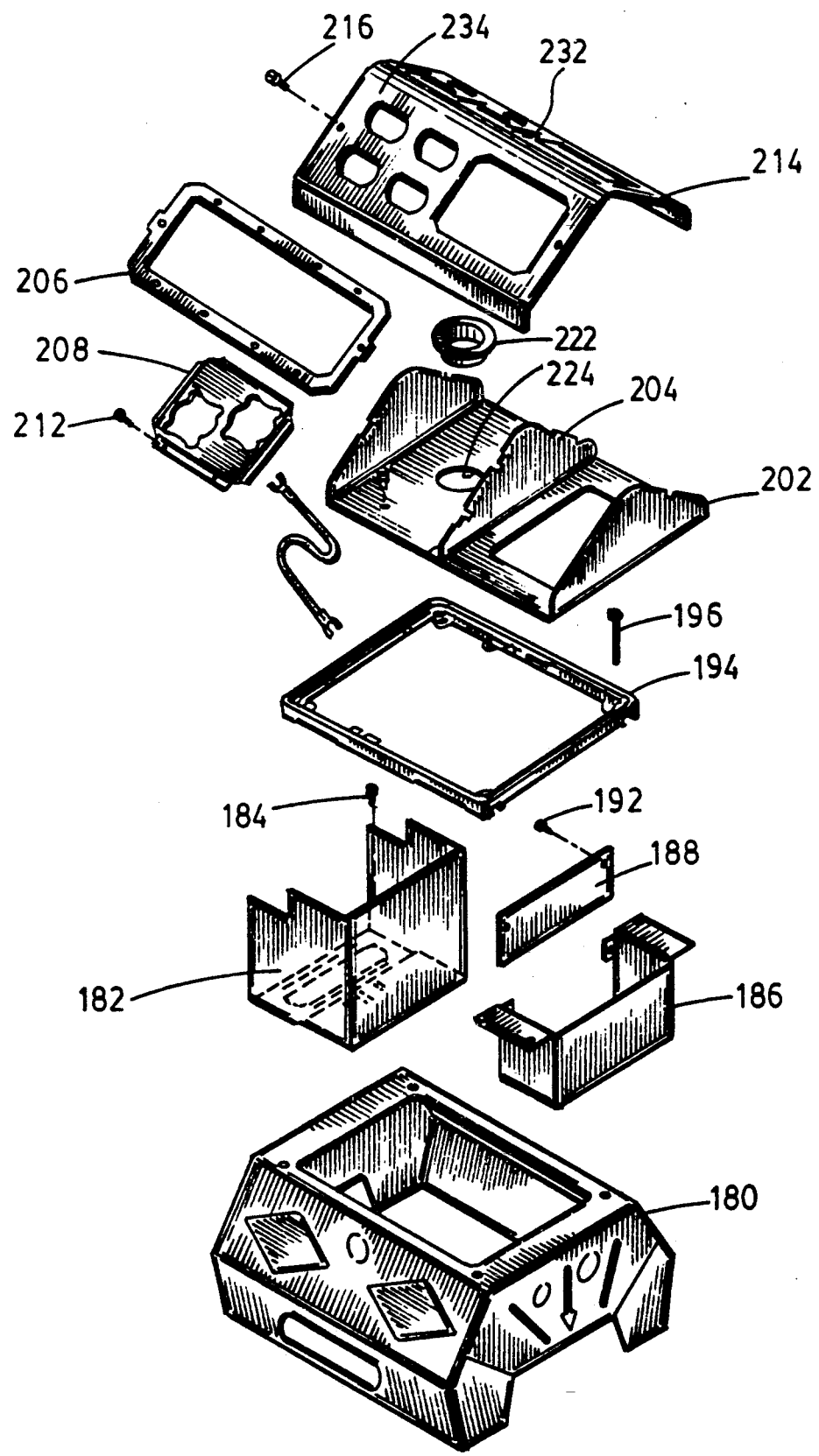
FIG. 7 is a perspective exploded view of a floor fitting, preset, and activation hardware according to the present invention.

A floor fitting according to the present invention may be activated through a preset. As best seen in FIG. 7, a conventional rectangular floor frame 194 is secured to a preset 180 by screws 196 (one shown) extending through holes in corners of a base 202 sized to overlie frame 194. In a manner conventional for flush preset activations, a power shield 182 is secured to a central power duct (not shown) by screws 184 (one shown). Power shield 182 extends upwardly from the power duct to base 202 to surround a section of base 202 including power opening 224. A grommet 222 in power opening 224 protects conductors routed through power opening 224.

A low tension shield 186 may be secured to the section of base 202 lying within frame 194 and overlying a section of preset 180 in communication with low tension telephone or data ducts (not shown), as is conventional for a flush preset activation. A shield plate 188 is secured to low tension shield by two mounting screws 192 (one shown) to augment the low tension shield 186.

The floor fitting of FIG. 7 is constructed and functions as described above for activation through floor fitting inserts. A partition 204 functions as partition 166, a faceplate 208 is secured to mounting frame 206 by screws 212 (one shown) and mounting frame 206 is secured to a cover 214 by screws 216 (one shown) as described above. Low tension connectors may be positioned in faceplate 208 and duplex power connectors may be secured to mounting frame 206 as described above.

The cover 214 provides two activation sides 232 and 234 provide greater area for connectors than a conventional flush activation overlying frame 194 or conventional recessed activation in the interior of preset 180. In addition, positioning connectors on mounting frames above the frame 194 provides easier access to connectors during connection to conductors and reduces installation time compared to a conventional preset activation.

It will be understood that the foregoing description is for purposes of illustrating the principles of the present invention. A floor fitting may be constructed in accordance with the foregoing teaching for activation from one or more conductor carrying ducts. Also, floor fittings according to the present invention may be activated from cellular raceway in the manner described above for conductor carrying ducts. Further, a floor fitting according to the present invention may be activated through a preset overlying a single duct. The scope of this invention is determined, however, by reference to the following claims.

I claim:

1. An improved floor fitting to be positioned on a floor surface of a concrete floor and activated from two conductor-carrying ducts within the concrete floor through two separated activation holes in the floor that each extend from an opening in the floor surface to a hole in a wall of one of the conductor-carrying ducts and two floor fitting inserts, each insert defining a conductor passage extending through the insert from a duct end to a base end and secured in one activation hole, one insert sized to be positioned in one activation hole having the duct end adjacent to the conductor-carrying duct with the conductor passage communicating with the hole in the wall of the conductor-carrying duct and the base end adjacent to the activation hole opening in the floor surface, and the other insert sized to be positioned in the other activation hole having the duct end adjacent to the conductor-carrying duct with the conductor passage communicating through the hole in the wall of the conductor-carrying duct and the base end adjacent to the activation hole opening in the floor surface, the floor fitting comprising:

a base sized to overlie a section of the floor surface surrounding the two activation hole openings and constructed to define two activation openings, one positioned to overlie one activation hole opening and the other positioned to overlie the other activation hole opening;

the base end of one insert secured to the base adjacent to one of the activation openings with the conductor passage of the insert communicating through the activation opening and the base end of the other insert secured to the base adjacent to the other activation opening with the conductor passage of the other insert communicating through the other activation opening;

a cover constructed to overlie the base defining a housing interior between the cover and the base that communicates with the conductor passages of the floor inserts and defining openings that communicate with the housing interior; and a connector frame adapted to support and position connectors adjacent to openings in the cover to accept plug connections from outside the housing, and to be secured to the base independent of the cover whereby a connector positioned in the housing interior adjacent to the openings in the cover may be connected to conductors entering the interior of the housing through the activation openings from the conductor passages and the conductor carrying ducts and connected to connectors in the floor fitting.

2. The floor fitting of claim 1 further comprising an internal shielding partition in the housing interior intermediate activation openings and constructed to substantially conform to the cover and base dividing the interior of the housing into two activation sections and wherein connectors are mounted in one of the sections and activated only from conductors routed into the section from the activation opening communicating with the activation section in which the connector is positioned.

3. The floor fitting of claim 2 wherein an intumescent wafer is positioned within each floor insert defining a section of the conductor passage extending through the insert.

4. An improved floor fitting to be positioned on a floor surface of a concrete floor and activated from a conductor-carrying duct within the concrete floor through an activation hole in the floor that extends from an opening in the floor surface to a hole in a wall of the conductor-carrying ducts and an insert defining a conductor passage extending through the insert from a duct end to a base end and secured in an activation hole, the insert sized to be positioned in the activation hole having the duct end adjacent to the conductor-carrying duct with the conductor passage communicating with the hole in the wall of the conductor-carrying duct and the base end adjacent to the activation hole opening in the floor surface, the floor fitting comprising:

a base sized to overlie a section of the floor surface surrounding the activation hole opening and constructed to define an activation opening positioned to overlie the activation hole opening;

the base end of the insert secured to the base adjacent to the activation opening with the conductor passage of the insert communicating through the activation opening;

a cover constructed to overlie the base defining a housing interior between the cover and the base that communicates with the conductor passage of the floor insert and defining openings that communicate with the housing interior; and a connector support adapted to support and position connectors adjacent to openings in the cove to accept plug connections from outside the housing, and to be secured to the base independent of the cover whereby connectors may be activated by connection to conductors pulled into the housing through the conductor passage from the conductor carrying ducts, mounted to the connector support and the connector support secured to the base to position connectors adjacent to the openings in the cover without connection to or interference with the cover.

5. The floor fitting of claim 4 wherein an intumescent wafer is positioned within the floor insert defining a section of the conductor passage extending through the insert.

6. An improved floor fitting for activation of services from a service distribution system including conductor-carrying ducts cast into a concrete floor and activation channels extending from the conductor carrying ducts to activation openings in a surface of the concrete floor, the floor fitting comprising:

a base having a section sized to overlie a section of the surface of the concrete floor surrounding an activation opening and having an opening sized to accept conductors from the activation channel, the section of the base constructed to overlie the floor surface having two end edges separated in a longitudinal direction and two straight and parallel side edges defining boundaries of the base extending from one end edge to the other end edge, the end edges and side edges defining a boundary of the section of the base overlying the floor surface;

a cover sized and positioned to overlie the base having two side edges adjacent to the side edges of the base and a first skirt extending from the side edge of the cover to a bottom edge of an activation side of the cover adjacent to the side edge of the base and a second skirt extending from the other side edge of the cover to a bottom edge of a second activation side adjacent to the other side edge of the base, the activation sides sized to overlie at least two conventional duplex power receptacles and extending away from the adjacent side edge of the cover toward each other, the cover constructed to have end edges defining sections of a boundary of the cover adjacent to the end edges of the base; and two end walls each extending from one end edge of the base to an underside of the cover separated from the cover end edge by a cover treatment thickness whereby the floor fitting is sized to support at least four conventional duplex power connectors and is adapted to accept a decorative cover treatment overlying the ends of the cover without extending beyond the cover and edges.

7. The improved floor fitting of claim 6 wherein the cover defines openings in a first activation side and further comprising a connector support adapted to support and position connectors adjacent to openings in the first activation side and to accept plug connections from outside the fitting, and to be secured to the base independent of the cover, whereby plug connections may be used to provide services to equipment positioned near the floor fitting.

8. The improved floor fitting of claim 7 wherein each activation side is generally rectangular having a top edge parallel to and spaced apart from the bottom edge and parallel spaced apart end edges forming sections of the end edges of the cover.

9. The improved floor fitting of claim 8 further comprising an activation faceplate sized and constructed to be mounted to the connector support and one of the activation openings is sized and positioned to surround the activation faceplate, whereby a connector may be mounted within the floor fitting by mounting to a faceplate that is sized to be positioned within the faceplate opening and mounted within the floor fitting.

10. An improved floor fitting activated by conductors extending through an activation channel extending into a floor from an activation opening in a surface of the floor, the floor fitting comprising:

a base sized to overlie a section of the floor surface surrounding the activation opening and constructed to define an activation opening sized to accept conductors from the activation opening in the floor;

a cover constructed to overlie the base and define a housing interior between the cover and the base that communicates with the activation opening in the base and define openings that communicate with the housing interior; and a connector support adapted to support and position connectors in the housing interior adjacent to the openings in the cover to accept plug connections from outside the cover, and to be secured to the base independent of the cover whereby connectors may be activated by connection to conductors pulled into the housing through the activation opening in the floor and base of the floor fitting, mounted to the connector support and the connector support secured to the base to position and connectors adjacent to openings in the cover without connection to or interference with the cover.

11. The improved floor fitting of claim 10 wherein the base is sized to be positioned on and adapted to be secured to a preset cast into a concrete floor that defines the activation channel in the floor.

12. The improved floor fitting of claim 11 wherein the base defines two activation openings and the floor fitting further comprises an internal shielding partition intermediate the activation openings constructed to substantially conform to the cover and base dividing the interior of the housing into two activation sections and wherein connectors are mounted in one of the activation sections and activated only from conductors routed into the activation section from the activation opening communicating with the activation section in which the connector is positioned.

13. An improved floor fitting activated by conductors extending through an activation channel extending into a floor from an activation opening in a surface of the floor, the floor fitting comprising:

a base having a section size and constructed to overlie a section of the surface of the floor surrounding the activation opening that defines an opening sized to accept conductors from the activation channel, two end edges separated in a longitudinal direction, and two straight and parallel side edges defining boundaries of the base extending from one end edge to other end edge, the end edges and side edges defining a boundary of the section of the base overlying the floor surface;

a cover sized and positioned to overlie the base having a first side edge and a second side edge and two skirts, the first side edge adjacent to one side edge of the base and the second side edge adjacent to the other side edge of the base, one skirt extending from the first side edge of the cover to a bottom edge of an activation side of the cover adjacent to the one side edge of the base and a second skirt extending from the second side edge of the cover to a bottom edge of a second activation side adjacent to the other side edge of the base, the activation sides sized to overlie at least two conventional duplex power receptacles and extending away from the adjacent side edge of the base toward each other, the cover constructed to have end edges defining sections of a boundary of the cover adjacent to the end edges of the base; and two end walls each extending from one end edge of the base to an underside of the cover separated from the cover end edge by a cover treatment thickness whereby the floor fitting is sized to support at least four conventional duplex power connectors and is adapted to accept a decorative cover treatment overlying the ends of the cover without extending beyond the cover end edges.

14. The improved floor fitting of claim 13 wherein the base is sized to be positioned on and adapted to be secured to a preset cast into a concrete floor that defines the activation channel in the floor.

15. The improved floor fitting of claim 14 wherein the base defines two activation openings and the floor fitting further comprises an internal shielding partition intermediate the activation openings constructed to substantially conform to the cover and base dividing the interior of the housing into two activation sections and wherein connectors are mounted in one of the activation sections and activated only from connectors routed into the activation section from the activation opening communicating with the activation section in which the connector is positioned.

* * * * *